Figure 1:
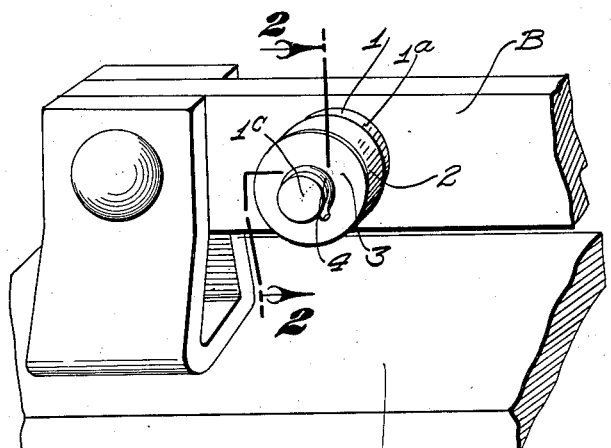

March 12, 1935.  W. E. LE ROY  1,994,222
ELECTRICAL CONDUCTOR HEAT DETECTOR

Filed March 3, 1931

INVENTOR
WINFIELD E. LE ROY
BY A. B. Bowman
ATTORNEY

Patented Mar. 12, 1935

1,994,222

UNITED STATES PATENT OFFICE 1,994,222

ELECTRICAL CONDUCTOR HEAT DETECTOR

Winfield E. Le Roy, San Diego, Calif.

Application March 3, 1931, Serial No. 519,877

4 Claims. (Cl. 177—311)

My invention relates to electrical conductor heat detectors, and the objects of my invention are:

First, to provide a detector of this class which is particularly adapted for use in connection with knife switches but which may be used with equal effectiveness with electrical buses or bus-bar conductors;

Second, to provide a detector of this class which is adapted to be installed upon a conductor wherever a rise in temperature of such conductor would be indicative of overloading a fault or trouble in the line, particularly a fault due to poor or loose connections;

Third, to provide a detector of this class which makes a visual record of any over-heating of the conductor, thereby eliminating the need of inspection of the electrical system so equipped during intervals of peak loads as inspection may be made at any convenient time;

Fourth, to provide a detector of this class which utilizes the fact that slight over-heating precedes a serious trouble in the electrical system by operating in response to a slight over-heating of a predetermined amount so that the trouble may be detected and averted before serious damage results;

Fifth, to provide a detector of this class which is particularly adapted for use in out-of-the-way or poorly lighted places where over-heating might otherwise go undetected;

Sixth, to provide a detector of this class which is extremely economical of construction, installation and replacement so that detectors may be installed on switches and bus-bars of a switch board or the like near every point where over-heating can possibly be caused, without materially increasing the cost of installation;

Seventh, to provide a detector of this class which is always ready to function upon over-heating of the switch or conductor, although the detector may have been inactive for an exceedingly long period of time;

Eighth, to provide a detector of this class which may be readily and quickly replaced after it has once accomplished its function and the trouble been corrected; and Ninth, to provide on the whole a novelly constructed recording detector which is extremely simple of operation and of construction durable, efficient in its action and which will not readily deteriorate or get out of order.

Figure 2:
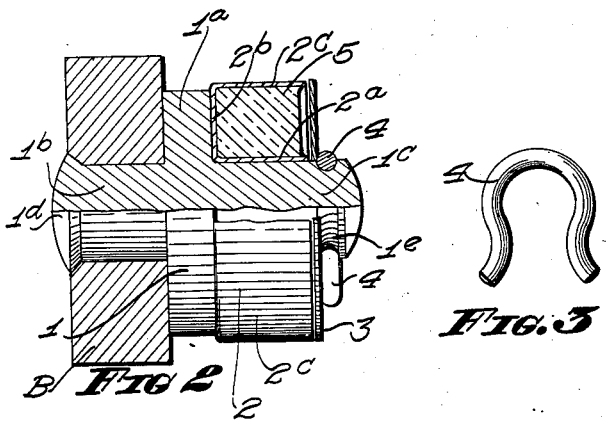
Figure 3:
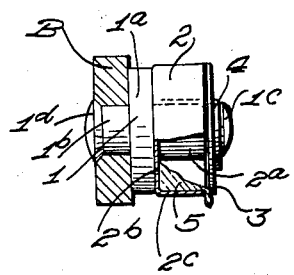
Figure 4:
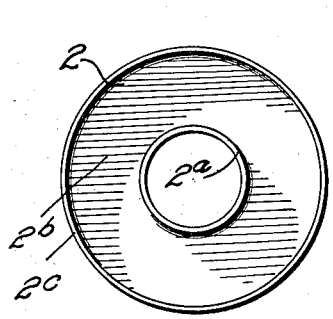
Figure 5:
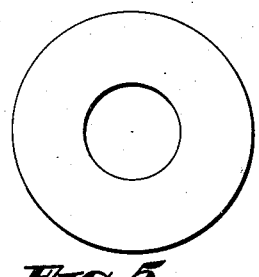
Figure 6:

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a fragmentary perspective view of a knife switch showing my detector attached thereto; Fig. 2 is an enlarged fragmentary sectional view of the detector taken through 2—2 of Fig. 1 with parts and portions as shown in elevation; Fig. 3 is an end view of the retaining clip; Fig. 4 is an end view of the detecting material container with the detecting material removed; Fig. 5 is an end elevational view of the support member; and Fig. 6 is a reduced, fragmentary sectional view of the assembled detector as it appears after its operation.

Similar characters of reference refer to similar parts and portions through the several views of the drawing.

Support member 1, container member 2, cover plate 3, clip member 4, and detector material 5, constitute the principal parts and portions of my electrical conductor heat detector.

The detector structure includes a support 1 which comprises an enlarged disk shaped portion $1a$ intermediate its ends with stem or shank portions $1b$ and $1c$ extending axially from opposite sides thereof. The shank portion $1b$ is adapted to extend through a hole which is formed in the knife or switch bar B of the knife switch structure S as shown in Fig. 1. The extended end of the shank 1 forms a rivet head portion $1d$ which firmly secures the support to the blade B. The disk $1a$ bears against the side of the blade B, so as to receive heat therefrom as well as through the stem $1b$ and further to provide ample conducting material around the opening provided in the bar.

The second shank or stem $1c$ is somewhat longer than the stem $1b$ and is adapted to slidably receive a sleeve portion $2a$ of the container 2. The container 2 is in the form of an annular U-shaped panel member on which the sleeve forms the inner wall. The base $2b$ of the channel is adapted to rest against the disk or enlarged body portion $1a$ of the support. The outer side or wall $1c$ of the detector extends until substantially flush with the outer extremity of the sleeve $2b$ so as to form therewith an annular opening to the container.

This opening is closed by an annular plate 3 which is slidable upon the shaft $1c$. The plate is held so as to loosely cover the opening to the container by a U-shaped spring clip 4 which fits in an annular channel 1e near the extremity of the shank or stem 1c.

The container 2 is filled with a non-conducting material. This material is in the form of a solid below the critical temperature of the switch bar or bus-bar upon which it is mounted; that is, at a temperature which when exceeded, indicates trouble in the circuit, and below which is within the safe range of heating. For example the detector material 5 may be of such a nature to melt around 200° Fahrenheit. Such a temperature should be approximately the maximum tolerated temperature. The detector is mounted in such a manner that the open side of the container is vertical whereby upon over-heating of the bus-bar or knife switch blade, the material melts and runs out between the container and the cover. There is provided a sufficient slit for this purpose as shown best in Figs. 2 and 6. The detectors are preferably located so that the melted detector material may collect in some readily visible spot as indicated in Fig. 6.

The quantity of detector material and the latent heat of liquidation thereof may be such that the intensity or duration of the over-heating period may be roughly estimated by the quantity of material which has melted from the container.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a detector of the class described, a support member including an enlarged base portion arranged contiguous to and secured to a conductor so as to receive heat therefrom and a stem extending from said base member, and a detector unit including an annular container slidable upon said stem and arranged to bear against said base portion so as to receive heat therefrom, said container having an open side, a cover spaced from the open side of said container, a fusible detector material in said container and means in connection with said stem for holding said cover and container on said stem in spaced relation whereby said detector material will melt and run from said container at a given temperature.

2. In a detector of the class described, a support member including an enlarged base portion arranged contiguous to and secured to a conductor so as to receive heat therefrom and a stem extending from said base member, and a detector unit, including an annular container member of U-shaped cross-section, the inner wall thereof forming a sleeve arranged to fit upon said stem, the base, thereof arranged to bear against said base member, said container being open at its extended side, a cover plate mounted upon said stem in slight spaced relation therewith arranged to loosely close the open side of said container, and a retaining means in connection with said stem and cover plate for holding said cover plate in such loosely associated relation with said container.

3. In a detector of the class described, a heat conducting support associated with an electrical conductor, a container mounted on said support to receive the heat therefrom and having a limited outlet opening, a fusible detector material filling said container, the volume of the container its limited outlet and the character of the detector material being such that flow of the detector material continues for a considerable period when the electrical conductor continues in an over-heated state, there being provided horizontally disposed means upon which a melted detector material collects, whereby the quantity of detector material less than the whole thereof when drained from the container and its condition as deposited is evidence of the intensity or duration of the over-heating of said electrical conductor.

4. In a detector of the class described, a heat conducting support associated with an electrical conductor, a container readily removably mounted on said support to receive the heat therefrom, said container having a metering opening, a fusible detector material filling said container, the volume of the container, size of the metering opening, and character of the detector material being such that flow of the detector material continues for a considerable period when the electrical conductor continues in an over-heated condition, there being provided horizontally disposed means upon which a melted detector material collects, whereby the quantity of detector material less than the whole thereof when drained from the container and its condition as deposited is evidence of the intensity or duration of the over-heating of said electrical conductor.

WINFIELD E. LE ROY.